(12) United States Patent
Bassali et al.

(10) Patent No.: US 8,750,115 B2
(45) Date of Patent: Jun. 10, 2014

(54) PRIORITY-BASED BUFFER MANAGEMENT

(75) Inventors: Harpal S. Bassali, Waltham, MA (US); Marcelo D. Lechner, Burlington, MA (US); Nosherwan Minwalla, Coppell, TX (US); Raul Aldrey, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 459 days.

(21) Appl. No.: 11/691,746

(22) Filed: Mar. 27, 2007

(65) Prior Publication Data

US 2008/0117926 A1 May 22, 2008

Related U.S. Application Data

(60) Provisional application No. 60/860,278, filed on Nov. 21, 2006.

(51) Int. Cl.
*H04L 12/26* (2006.01)

(52) U.S. Cl.
USPC ..................... 370/235; 375/240.02

(58) Field of Classification Search
None
See application file for complete search history.

(56) References Cited

U.S. PATENT DOCUMENTS

| | | | | |
|---|---|---|---|---|
| 5,903,283 A | * | 5/1999 | Selwan et al. | 345/535 |
| 6,721,789 B1 | | 4/2004 | DeMoney | |
| 6,834,053 B1 | * | 12/2004 | Stacey et al. | 370/395.4 |
| 6,982,956 B2 | * | 1/2006 | Blanc et al. | 370/235 |
| 6,996,838 B2 | * | 2/2006 | Rodriguez | 725/95 |
| 7,657,672 B2 | * | 2/2010 | Kampmann et al. | 710/52 |
| 7,872,688 B2 | * | 1/2011 | Relan et al. | 348/584 |
| 2002/0181396 A1 | | 12/2002 | Chen et al. | |
| 2003/0067877 A1 | | 4/2003 | Sivakumar et al. | |
| 2004/0114576 A1 | * | 6/2004 | Itoh et al. | 370/352 |
| 2004/0221053 A1 | * | 11/2004 | Codella et al. | 709/231 |
| 2005/0047345 A1 | | 3/2005 | Suh | |
| 2006/0164987 A1 | * | 7/2006 | Floriach et al. | 370/235 |
| 2006/0184982 A1 | * | 8/2006 | Paz et al. | 725/88 |
| 2006/0236046 A1 | * | 10/2006 | Bowers | 711/159 |
| 2007/0054716 A1 | * | 3/2007 | Hiruta | 463/1 |
| 2007/0056013 A1 | * | 3/2007 | Duncan | 725/134 |
| 2007/0120873 A1 | * | 5/2007 | Relan et al. | 345/634 |
| 2007/0162873 A1 | * | 7/2007 | Haro et al. | 715/838 |
| 2008/0093498 A1 | * | 4/2008 | Leal et al. | 244/3.2 |

FOREIGN PATENT DOCUMENTS

| | | |
|---|---|---|
| EP | 1619839 | 1/2006 |
| WO | WO-03/052612 | 6/2003 |
| WO | WO-2006/064454 | 6/2006 |

OTHER PUBLICATIONS

Ahmed et al., "Adaptive Packet Video Streaming Over IP Networks: A Cross-Layer Approach," IEEE Journal on Selected Areas in Communications, vol. 23, No. 2, pp. 385-401, Feb. 2005.
Shao, et al., "User-aware Object-based Video Transmission Over the Next Generation Internet," Signal Processing: Image Communication, vol. 16, Issue 8, pp. 763-784, May 2001.
Xu, et al "Client Architecture for MPEG-4 Streaming," IEEE MultiMedia, vol. 11, Issue 2, pp. 16-23, Apr. 2004.

* cited by examiner

*Primary Examiner* — Rhonda Murphy

(57) ABSTRACT

Media units are stored in a buffer, wherein an importance rating is assigned to each of the media units. At least some of the media units are selectively flushed from the buffer based on the importance rating.

11 Claims, 4 Drawing Sheets

PRIORITY-BASED BUFFER MANAGEMENT

This application claims priority to U.S. Provisional Patent Application Ser. No. 60/860,278, entitled "STREAMING MEDIA BUFFER LATENCY MANAGEMENT" and filed Nov. 21, 2006, which is fully incorporated herein by reference in its entirety.

BACKGROUND INFORMATION

Streaming media generally refers to media content that is, or at least may be, played via playback software or a playback device at the same time that the media content is being downloaded from a source such as a media server. Streaming media content, e.g., video and audio content, may be provided according to a variety of standards and formats. For example, video standards such as QuickTime and RealMedia, and also standards promulgated by the Motion Picture Experts Group (MPEG), etc. are well known.

Many standards for streaming media content, such as MPEG streaming content delivery, were designed with dual objectives of (1) preserving network bandwidth and (2) maintaining video quality. However, MPEG and most other kinds of media streams are not designed with an objective of timely delivery of content, e.g., diminishing latency. For example, at present, content processing devices such as set top boxes (STBs) generally use MPEG and are designed to deliver a complete video stream at the expense of latency.

A media stream such as an MPEG stream reaching a STB can potentially face network jitter which can cause excessive storage of media frames, e.g., video frames, in a buffer in the STB. Frames received by the STB are not displayed until all the prior frames are displayed. However, in some contexts, e.g., interactive applications such as gaming, users expect timely updates on their video displays in response to a key press. At present, latencies caused by jitter often leave users with a video stream that is unsatisfactory for supporting applications in a variety of contexts.

Online gaming is one context in which media stream latencies may result in an unsatisfactory user experience. For example, when gaming is provided through a content processing device such as a set top box (STB) or the like, a game session is delivered to the STB as an MPEG video stream or the like through a packet switched network from a game server in a Video Hub Office (VHO). That is, the game session is conducted on the game server but is presented, through the MPEG stream, by the STB. Accordingly, the game session is encoded as an MPEG stream and streamed to the STB over the network. The MPEG stream is decoded by the STB and then displayed on a media playback device such as a television or video monitor. User inputs to the game are gathered through an input device such as a radio frequency (RF) or infrared remote control, a universal serial bus (USB) gamepad, etc. User inputs are then sent back to the game server over the packet switched network. The game server receives the user inputs and provides them to the game session for processing, thereby altering the output video stream where appropriate based on the inputs. Latencies in the MPEG stream may cause user inputs to be ill timed and/or ineffective, thus rendering the gaming experience unsatisfactory for the user.

In sum, many standards for providing streaming media, such as MPEG streaming content delivery, were designed with traditional objectives of preserving network bandwidth and maintaining video quality. However, as is the case with many media streams, MPEG video streams are not designed with an objective of timely delivery of content, e.g., diminishing latency. For example, at present, content processing devices such as set top boxes (STBs) are designed to deliver an uninterrupted video stream at the expense of latency.

DETAILED DESCRIPTION OF THE PREFERRED EMBODIMENTS

Figure 1:
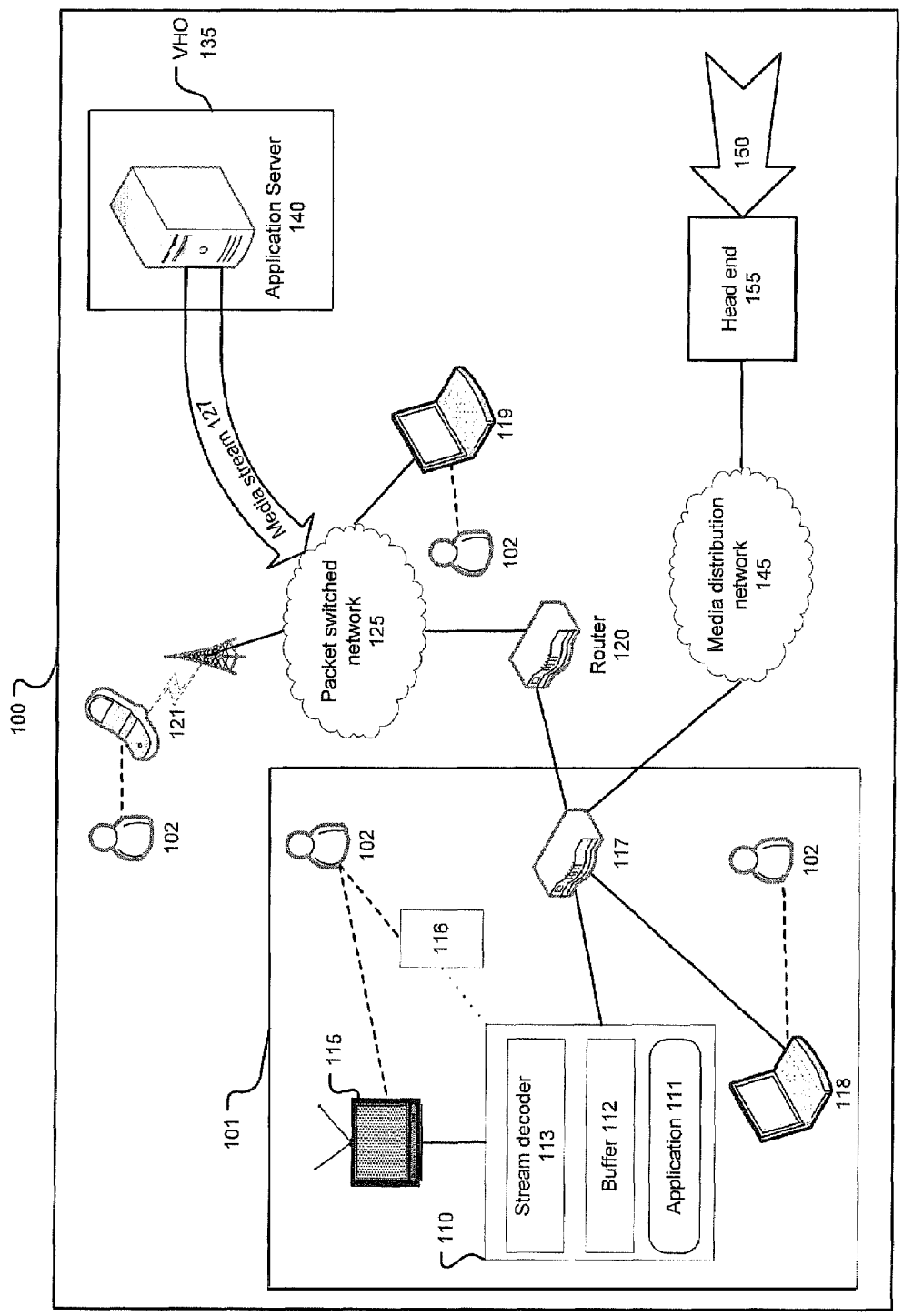
FIG. 1 illustrates an exemplary system for providing online gaming.

FIG. 1 illustrates an exemplary system 100 for providing online gaming to a customer premise 101, for access by a user 102 through a content processing device 110 and a media player 115. Customer premises 101 may be a home, business, or any other location including content processing device 110, and may include multiple content processing devices 110.

Content processing device 110 generally is a specialized device, e.g., a set top box (STB) or similar device, for receiving media content 150 from head end 155 via a network 145, and for providing media content 150 to a media player 115. Media content 150 may be provided as an analog signal or as a digital signal, e.g., an analog or digital video signal including a media stream. Content processing device 110 generally includes a processor and a memory, and may be provided with a proprietary or specialized operating system. For example, content processing device 110 may be an STB provided with a real time operating system (RTOS) such as is known. However, it will be understood that the role generally ascribed herein to content processing device 110 may instead be filled by: a computing device such as computers 118, 119; a mobile device such as cellular telephone 121; or any other device capable of receiving media content 150 from network 145 and executing program instructions such as may be stored on a computer-readable medium. Further, such a computing device need not be located within customer premises 101, but generally may be located anywhere that it may access a packet switched network 125, as is illustrated by the placement of devices 119 and 121 in FIG. 1.

Content processing device 110 may include a gaming application 111. Gaming application 111 generally includes program instructions for, among other things, receiving media stream 127. Gaming application 111 further generally includes program instructions for providing media stream 127 to user 102 through media player 115, and for receiving instructions and inputs from user 102, e.g, via control 116, such instructions and inputs to be provided to a gaming application server 140. To facilitate the provision of media stream 127 through media player 115, content processing device 110 generally includes a frame buffer 112, a stream decoder 113, e.g., a video coder/decoder (codec), and an audio coder/decoder (codec), such as are known. When received in a content processing device 110, units, e.g., frames, of media stream 127 are generally stored in buffer 112 to await processing by decoder 113. It will be understood that decoder 113 may be an MPEG codec, e.g., for the MPEG-2 or MPEG-4 standards, such as is known. Additional program instructions within content processing device 110 operate to synchronize audio and video in media stream 127, properly scale video, etc.

Media player 115 receives media content 150 from content processing device 110, and plays such media content 150 so that it can be perceived by a user. Media player 115 may be a television receiver, such as is known, including a television or a high definition television (HDTV). Media player 115 may also be used to provide a user interface to certain functions and menus provided by content processing device 110. For example, a television may be used to display a graphical user interface to access various menus within a STB. Further, it is possible that operations attributed herein to content processing device 110 and media player 15 may be performed partly or entirely by one of computing devices 118, 119, 121, etc., whereby media player 115 and/or content processing device 110 may be omitted from system 100.

A user 102 may utilize a control 116 to operate content processing device 110. Control 116 is generally a remote control that can selectively communicate with content processing device 110 through known wireless communications including infrared (IR) and radio frequency (RF) communications. Control 116 may include numeric keys, arrow buttons, keys for specific functions, directional keys, etc., and may also include alphanumeric keys. Control 116 may also be a wired or wireless keyboard or gamepad as is known. A user 102 may utilize control 116 to select media content channels, access various menus and optional settings, make selections and requests, and input data, such as user instructions or user input for a gaming client application 111 included within content processing device 110. Control 116 generally facilitates access to various functions and menus provided by or through content processing device 110, and may also be used to control other devices, including media player 115. In addition to performing operations ascribed herein to media player 115 and/or content processing device 110, one of computing devices 118, 119, 121, etc. may also include keys, buttons, a touchpad, or the like to perform operations described herein with reference to control 116, whereby control 116 may be omitted from system 100.

Content processing device 110 selectively communicates with various devices via a broadband home router (BHR) 117, including computer 118, which may be accessed by a user 102. BHR 117 may be one or more devices that are generally known for routing network traffic. BHR 117 facilitates data transfer over one or more networks, including a packet switched network 125 and a media distribution network 145.

BHR 117 is known for distributing audio, video, and data to devices within customer premises 101 such as content processing device 110. For example, BHR 117 may be a broadband home router or wireless broadband home router from Actiontec Electronics, Inc. of Sunnyvale, Calif. BHR 117 may also provide a wired or wireless local area network (LAN), thereby providing selective communications between various devices within customer premises 101. For example, computer 118 may utilize BHR 117 to communicate with content processing device 110. Computer 118 may be a computer workstation, a desktop, notebook, laptop, handheld computer, a personal digital assistant (PDA), a cellular phone, a smartphone, or some other computing device utilizing hardware and software to communicate with content processing device 110.

Content processing device 110 may use BHR 117 to send information to, and receive information from, a packet switched network 125. BHR 117 may access packet switched network 125 through a gateway router 120.

Content processing device 110 may also receive, via a packet switched network 125, a media stream 127. Various sources within a video hub office (VHO) 135 may provide media stream 127, including a gaming application server 140. Media stream 127 may be provided according to any one of a number of known standards, such as MPEC. Gaming server 140 is known for providing various interactive gaming applications for user 102, such applications providing media stream 127.

A media distribution network 145 is a network for providing media content 150, such as is known, For example, network 145 may include hardware and software for providing a video signal via a coaxial cable and/or a fiber optic cable. As is known, media content 150 is generally provided to a media distribution network 145 from a head end 155.

Packet switched network 125 can be generally an internet protocol (IP) network that utilizes known protocols found generally within the internet protocol suite. For example, network 125 can use protocols such as user datagram protocol (UDP), transmission control protocol (TCP), hypertext transfer protocol (HTTP), etc. Further, network 125 may include a variety of networks such as a wide area network (WAN), e.g., the Internet, a local area network (LAN), a fiber-optic network, etc. As is known, packet switched network 125 may be used to transport a variety of data, including multimedia data, such as audio and video. Accordingly, it is to be understood that embodiments are possible in which networks 125 and 145 are in fact combined into a single network, or in which media distribution network 145 is simply omitted, whereby packet switched network 125 is used to provide media content 150 to content processing device 110, computer 118, etc.

Gateway router 120 can route data packets in packet switched network 125 as known, thereby providing content processing device 110 access to packet switched network 125. By communicating with router 120, content processing device 110 is able to obtain a network address such as an internet protocol (IP) address, thereby enabling content processing device 110 to make requests to, and to receive data from an application server 140, etc.

Computing devices such as content processing device 110, client computer 118, gaming application server 140, and similar devices may employ any of a number of known computer operating systems. For example, such devices may use any known versions and/or varieties of the Microsoft Windows operating system; the Unix operating system (e.g., the Solaris operating system distributed by Sun Microsystems of Menlo Park, Calif.); the AIX UNIX operating system distributed by International Business Machines of Armonk, N.Y.; and the Linux operating system and the Vortex operating system distributed by Motorola, Inc. of Schaumberg, Ill. Computing devices may include any one of a number of computing devices that are known, including, without limitation, a computer workstation, a desktop, notebook, laptop, handheld computer, STB, or some other computing device.

Computing devices, such as content processing device 110 and other devices mentioned herein, generally are capable of executing instructions stored on a computer readable medium, such as instructions included in application 111. Computer-executable instructions may be compiled or interpreted from computer programs created using a variety of known programming languages and/or technologies, including, without limitation, and either alone or in combination, Java, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computing device. Such a medium may take many forms, including, but not limited to, non-volatile media, and volatile media. Non-volatile media include, for example, optical or magnetic disks and other persistent memory. Volatile media include dynamic random access memory (DRAM), which typically constitutes a main memory. Common forms of computer-readable media include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 2:
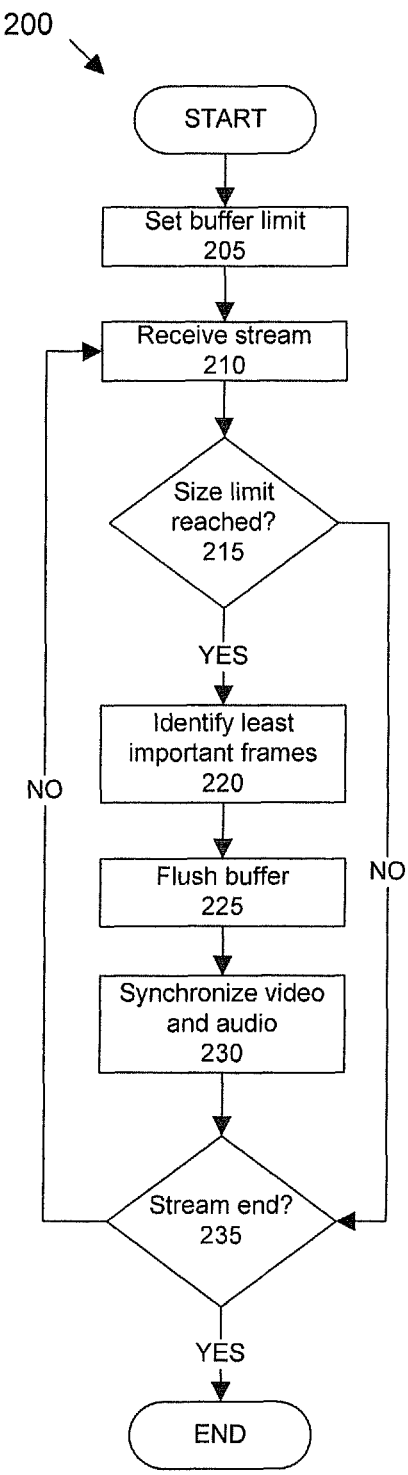
FIG. 2 illustrates an exemplary process for managing a frame buffer.

FIG. 2 illustrates an exemplary process 200 for selectively flushing one or more frames from buffer 112, according to an importance assigned to the frames, when a buffer 112 size limit is reached. Although frames are removed from buffer 112 when pulled by gaming application 111, frames may not be removed from buffer 112 as quickly as they are received from application server 140. Accordingly, it can be advantageous to selectively flush one or more frames from buffer 112.

Frames flushed from buffer 112 and process 200 are, according to exemplary embodiments, generally the least important frames in the buffer 112 as determined by an application server 140, e.g., a gaming server. Thus, a selective flush of buffer 112 advantageously preserves more recent and higher priority frames with full control by an application providing media stream 127, e.g., a gaming application, as to which frames are dropped. A selective buffer 112 flush also generally provides a high level of video quality as it takes into account application specific information and assigns a priority rating or ranking to individual frames in a video stream. Therefore, like processes mentioned above, process 200 presents the advantages of providing dynamic buffer limit adjustment during an application session, e.g., a gaming session, to compensate for delays in system 100 elements such as network 125, server 140, etc. The selective buffer 112 flush of process 200 can also account for current buffer conditions, and may thus flush buffer 112 only when it is advantageous to do so. It will be noted that this approach can utilize an implementation by an application vendor such as a gaming vendor to measure end-to-end latency and mark the priority or "importance" of every frame.

In step 205, a size limit for buffer 112 is established. For example, a server 140 may send an instruction to application 111 to set a size limit for buffer 112 based on an application, e.g. a game, requested by user 102.

Next, in step 210, content processing device 110, according to instructions in application 111, receives media stream 127 from application server 140, generally through network 125 as described above.

Next, in step 215, application 111 determines whether the size limit for buffer 112 established in step 205 has been reached. If the size limit has been reached, step 220 is executed next. Otherwise, step 235 is executed next.

Figure 3:
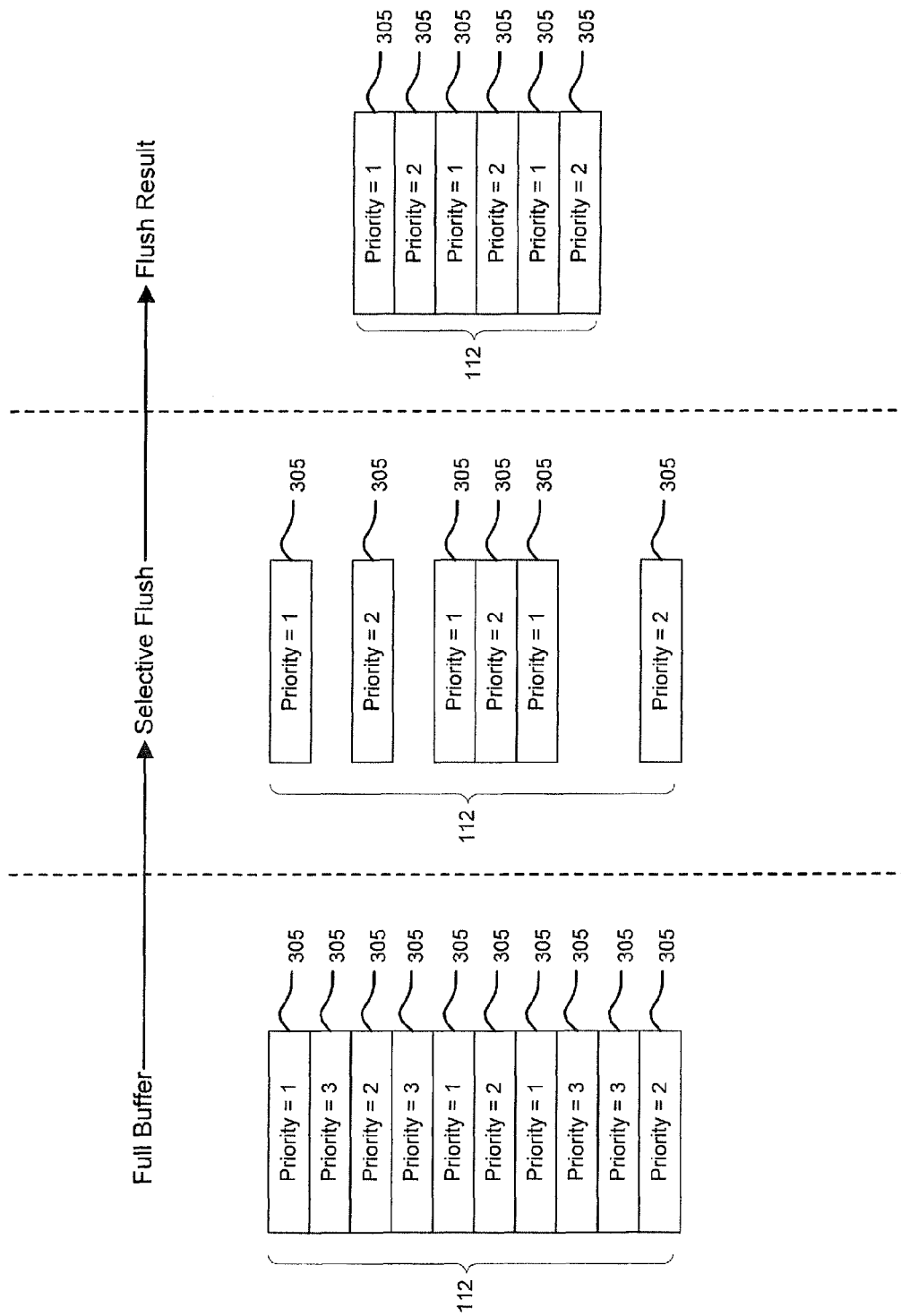
FIG. 3 provides an exemplary illustration of various states of a managed frame buffer.

Next, in step 220, application 111 identifies the least important frames stored in the full buffer 112. FIG. 3 provides an exemplary illustration of various states of buffer 112 during selective flush process 200.

As illustrated in FIG. 3, frames 305 stored in a full buffer 112 may each be assigned an importance rating such as "1," "2," or "3," where "1" denotes frames 305 of the highest importance, and "3" denotes frames 305 that are of least importance. Accordingly, in the example provided in FIG. 3, application 111 would identify four frames 305 assigned an importance rating of "3." Application 111 may identify the importance of a frame 305 in several different ways. It is possible that application server 140 could assign an importance to each frame's 305, and that an importance rating for each frame 305 be included in media stream 127. For example, it will be understood that an importance rating could be included in an MPEG transport stream. However, it is also possible that application 111 could determine an importance rating for each frame 305 without any instruction from application server 140. Manners in which importance ratings may be assigned to frames 305 are discussed in more detail below.

Returning to FIG. 2, in step 225, application 111 causes buffer 112 to selectively flush the least important frames 305 identified in step 220. Again referring to FIG. 3 by way of example, it will be seen that after a selective flush of buffer 1112, frames 305 that were assigned an importance rating of "3" are no longer present in buffer 112. Accordingly, the result of a selective buffer 112 flush as shown in FIG. 3 is a buffer 112 that includes only frames 305 assigned an importance rating of "1" or "2."

Next, in step 230, video codec 113 and audio codec 114 or other program instructions such as mentioned above synchronize audio and video in media stream 127. The synchronization step is important when performing a selective flush as in process 200, because when video frames 305 are flushed as in step 225, it is desirable that synchronization between video and audio in media stream 127 not be lost. It will be understood that known markers such as Program Clock References in an MPEG transport stream may be used to synchronize audio and video in media stream 127. Further, it will be understood that other elements in a media stream may require synchronization, and that the descriptions herein of audio and video are exemplary and not limiting.

Next, in step 235, application 111 determines whether media stream 127 has reached its end. If so, process 200 ends. Otherwise, process 200 returns to step 210.

Exemplary techniques for modeling frame importance include "motion-based modeling" and "user activity-based modeling."

Figure 4:
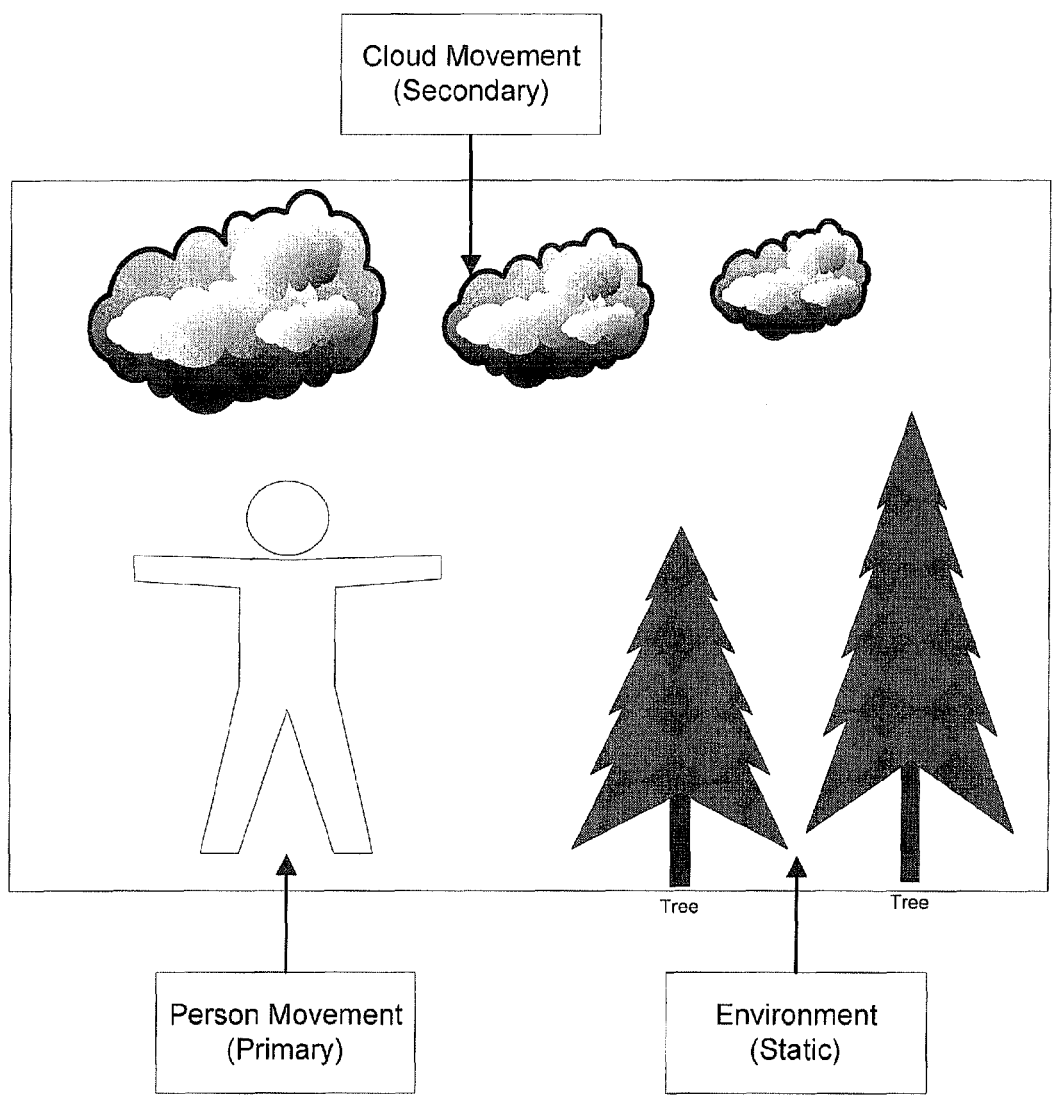
FIG. 4 provides an exemplary illustration of primary, secondary, and static objects in a frame of video.

Using motion-based modeling, some objects in media stream 127, e.g., a video stream, are identified as "primary objects" and other objects in the media stream 127 are identified as "secondary objects." FIG. 4 provides an exemplary illustration of primary, secondary, and static objects in a frame of video. With reference to the exemplary video image shown in FIG. 4, frames capturing motion of primary objects are assigned the highest level of importance, e.g., "1," while frames capturing motion of secondary objects are assigned a lower level of importance, e.g., "2." Frames that generally include static information are assigned to a lowest level of importance, e.g., "3." Motion-based modeling requires application server 140, e.g., a gaming server; to include programming for understanding the semantic of the particular instance of the application, i.e., which objects are most important and therefore primary, and which objects are less important and therefore secondary, etc. Accordingly, motion-based modeling requires some effort on the part of a game vendor. Further, motion-based modeling requires application server 142 to include importance ratings for frames in media stream 127.

In user activity-based modeling, components of a media stream, e.g., frames, are assigned importance based on whether they are associated with user interaction. For example, frames resulting from user interaction are assigned a high level of importance, e.g., "1." Thus, in the example of FIG. 4, illustrating an exemplary frame from a game, user activity may cause movement in the image of a person, and therefore frames in which the person moves may be assigned the highest level of importance. Frames resulting from automated changes in the application instance, e.g., a gaming session, are assigned a lower level of importance, e.g., "2." Again referring to the example of FIG. 4, frames featuring cloud movement are frames resulting from automated changes in the application instance. Frames that generally include static information are assigned to a lowest level of importance, e.g., "3." Advantageously, user activity-based modeling generally provides high-quality video without the need to rely on application-specific logic, and can be performed according to program instructions in application 111.

Exemplary embodiments discussed herein include a network-based streaming gaming service, and are further discussed in the context of streaming video. However, embodiments are possible and contemplated that extend to any media streaming service where timely delivery of content, in addition to reducing latency, is advantageous. For example, media stream 127 could include still images or some data stream providing stock ticker information.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   receiving a media stream that includes a plurality of media units, each of the media units having at least one frame including one or more objects, wherein the media stream is received via a packet switched network;
   storing the received media units in a buffer;
   identifying an importance rating included in the media stream for each of the media units, the importance rating for a media unit being based on whether an object included in the media unit is a primary, secondary, or static object and is associated with user interaction;
   selectively flushing at least some of the received media units with a lower importance rating from the buffer based on the importance rating; and
   providing at least some of the units that remain in the buffer to a coder/decoder,
   wherein the coder/decoder selectively retrieves frames from the buffer, synchronizes audio and video of the retrieved frames to obtain synchronized media frames, and selectively provides, to a media player, output based on the synchronized frames.

2. The method of claim 1, wherein the media stream is formatted according to a standard of the Motion Picture Experts Group (MPEG).

3. The method of claim 1, further comprising assigning a size limit to the buffer.

4. The method of claim 3, further comprising determining, prior to selectively flushing some of the units from the buffer, that the size limit has been met.

5. The method of claim 1, embodied on a non-transitory computer-readable medium as computer-executable instructions.

6. A system, comprising:
   a media buffer that selectively receives and stores media units, each of the media units having at least one frame that includes one or more objects, wherein a media stream includes the media units and the media stream is transported via a packet switched network;
   wherein an importance rating is included in each of the media units based on whether an object included in the media unit is a primary, secondary, or static object and is associated with user interaction;
   program instructions for selectively flushing at least some of the received media units with a lower importance rating from the buffer based on the importance rating; and
   providing at least some of the frames that remain in the buffer to a coder/decoder that selectively retrieves frames from the buffer, synchronizes audio and video of the retrieved frames to obtain synchronized frames, and selectively provides, to a media player, output based on the synchronized frames.

7. The system of claim 6, further comprising an application server that selectively provides the media stream that includes the media units.

8. The system of claim 6, wherein the media stream is formatted according to a standard of the Motion Picture Experts Group (MPEG).

9. The system of claim 6, wherein a size limit is assigned to the buffer.

10. The system of claim 6, wherein the program instructions include instructions for determining, prior to selectively flushing some of the media units from the buffer, that the size limit has been met.

11. A method, comprising:
    receiving a media stream that includes a plurality of media units, each of the media units having at least one frame that includes one or more objects;
    identifying an importance rating included in the media stream for each of the media units, the importance rating for a media unit being based on whether an object included in the media unit is a primary, secondary, or static object and is associated with user interaction;
    receiving the media frames in a media stream via a packet switched network;
    storing the received media frames in a buffer;
    assigning a size limit to the buffer;
    determining that the size limit has been met;

selectively flushing at least some of the received media frames with a lower importance rating from the buffer based on the importance rating; and providing at least some of the frames that remain in the buffer to a coder/decoder, wherein the coder/decoder selectively retrieves frames from the buffer, synchronizes audio and video of the retrieved frames to obtain synchronized frames, and selectively provides, to a media player, output based on the synchronized frames.

* * * * *